United States Patent [19]

Hasegawa

[11] Patent Number: 5,435,952
[45] Date of Patent: Jul. 25, 1995

[54] PROCESS FOR MANUFACTURING SIC-BASED CERAMIC PRECURSORS

[75] Inventor: Yoshio Hasegawa, Higashi Ibaraki, Japan

[73] Assignee: The Foundation: The Research Institute for Special Inorganic Materials, Kashima, Japan

[21] Appl. No.: 184,346

[22] Filed: Jan. 19, 1994

Related U.S. Application Data

[63] Continuation of Ser. No. 823,333, Jan. 21, 1992, abandoned.

[30] Foreign Application Priority Data

Jan. 21, 1991 [JP] Japan .................................. 3-044587

[51] Int. Cl.⁶ .............................................. B29C 35/04
[52] U.S. Cl. ............................................ 264/83; 264/236
[58] Field of Search ............... 264/82, 83, 234, 236, 264/345, 347; 501/88, 95

[56] References Cited

U.S. PATENT DOCUMENTS

4,847,027 7/1989 Lu ........................................ 264/65

FOREIGN PATENT DOCUMENTS

0251678 1/1988 European Pat. Off. .
52-5321 1/1977 Japan .
62-14647 4/1987 Japan .
2264017 10/1990 Japan .
3119114 5/1991 Japan .

OTHER PUBLICATIONS

Chemical Abstracts, vol. 114, No. 16, 22 Apr. 1991, U.S., Abstract No. 148865d, Shimada et al, "Manufacture of Silicon . . . ".
"Polymer Preprints, Japan", vol. 38, No. 12, (1989)/& Eng Trans. Seguchi et al; 3X095 Curing Treatment by Irradiation.

*Primary Examiner*—Christopher A. Fiorilla
*Attorney, Agent, or Firm*—Stevens, Davis, Miller & Mosher

[57] ABSTRACT

A process for manufacturing SiC-based ceramic precursors by curing a polycarbosilane shaped body while it is in contact with vapor of at least one hydrocarbon selected from the group consisting of halogenated hydrocarbons and unsaturated hydrocarbons of ethylene series and acetylene series. This process can cure polycarbosilane shaped bodies without introducing oxygen thereinto and requires no special apparatuses. The obtained precursor is suited for synthesizing SiC-based ceramics efficiently without deteriorating characteristics thereof, particularly excellent in high-temperature strength.

6 Claims, 1 Drawing Sheet

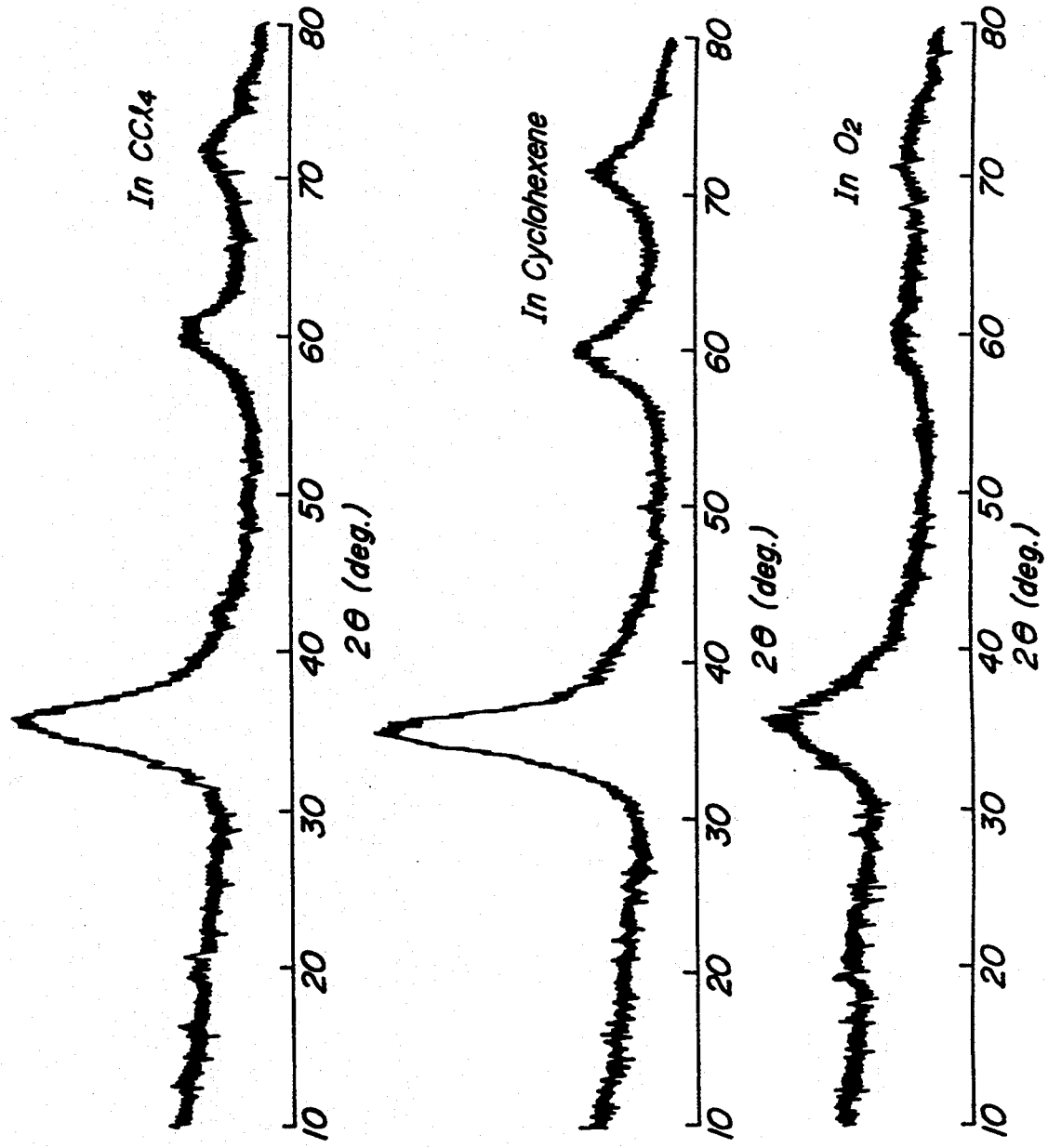
FIG. 1 — In CCl₄
FIG. 2 — In Cyclohexene
FIG. 3 — In O₂

PROCESS FOR MANUFACTURING SIC-BASED CERAMIC PRECURSORS

This application is a continuation of application Ser. No. 07/823,333, filed Jan. 21, 1992 now abandoned.

BACKGROUND OF THE INVENTION

1. Field of the Invention

The present invention relates to a process for manufacturing SiC-based ceramic precursors by curing a polycarbosilane shaped body, particularly a granular, powdery, fibrous, filmy or other finely shaped body.

2. Description of the Prior Art

Ceramics have drawn attention as a material excellent in heat-resistance, abrasion-resistance, high-temperature strength or the like. Diversified materials have been molded and sintered by various processes and used as ceramic materials. A process for synthesizing ceramic materials, inter alia, wherein polymers containing a metallic element, beginning with organosilicone polymers, are used as a ceramic precursor, is particularly suited for manufacturing ceramic materials, such as fibers, which are impossible to manufacture according to processes wherein powder is molded and sintered. Accordingly, various polymers have so far been studied. Among these polymers, polycarbosilanes having a skeleton composed mainly of SiC linkages are very useful as a precursor for SiC-based ceramics. Particularly, silicon carbide fibers synthesized by melt-spinning a polycarbosilane followed by curing and then firing have been extensively studied for application as a fiber reinforcement in composite materials.

Heretofore, in the case where such polycarbosilanes are employed as a ceramic precursor, there have been used processes wherein a polycarbosilane is melted or dissolved in a solvent, then shaped into a desired shape and fired to yield a ceramic. The shaped body is generally subjected to a curing treatment before firing so as not to melt in the firing step after shaping. There may be the case where firing can be conducted without the curing treatment. However, it is in the case of polymers of a high molecular weight pyrolyzable without passing through a molten state. Such a polycarbosilane is synthesized in a low yield and requires a dry-spinning or dry-extruding process for fiber- or film-formation, so that it is lacking in industrial value. As a generally employed curing treatment process, processes for heating polycarbosilanes at a temperature in the vicinity of a softening point thereof or irradiating with γ-ray, electron beams or the like, in an oxidative atmosphere such as air or oxygen, are disclosed in Japanese Patent Laid-open Application No. 52-5,321 and Japanese Patent Publications Nos. 58-22,570 (J. P. No. 1,194,004), 61-9,246 (J. P. No. 1,345,083), and 62-14,647 (J. P. No. 1,408,310). Alternatively, as a process for curing polycarbosilanes without introducing oxygen thereinto, a process of irradiating electron beams in vacuum or an inert gas atmosphere is disclosed in Japanese Patent Publication No. 62-14,647 (J. P. No. 1,408,310) and further recently in Polymer Preprints, Japan, Vol. 38, No. 12 (1989).

However, amongst these processes, the process of treating polymers in an oxidative atmosphere, since oxygen is introduced into the polymers by oxidation, causes deterioration of characteristics of synthesized SiC-based ceramics. Further, high-temperature strength remarkably decreases, since the polymers are crystallized into cristobalite at high temperatures or emit carbon monoxide decomposed at further higher temperatures.

Alternatively, the curing process without introducing oxygen wherein electron beams are irradiated in vacuum or an inert gas atmosphere has drawbacks such that special apparatuses are required for electron beam irradiation, etc., treatment on a massive scale is difficult to conduct, or the like.

SUMMARY OF THE INVENTION

The present invention has been accomplished in order to obviate the above drawbacks of the conventional processes.

An object of the present invention is to provide precursors suited for synthesizing SiC-based ceramics without deteriorating characteristics thereof, particularly excellent in high-temperature strength, efficiently from polycarbosilane shaped bodies.

Another object is to provide a process suited for mass-producing such precursors at a low cost, without requiring special apparatuses.

Namely, as a result of assiduous studies on curing of polycarbosilanes without using oxygen, the inventor has found that polycarbosilanes can be cured with hydrocarbon vapor and, further, these cured polycarbosilanes are particularly useful as a precursor for SiC-based ceramics, since ceramics prepared therefrom have excellent characteristics. Thus, the present invention has been reached.

The process for manufacturing SiC-based ceramic precursors according to the present invention is characterized in that a polycarbosilane shaped body is cured by contacting vapor of at least one hydrocarbon selected from the group consisting of halogenated hydrocarbons and unsaturated hydrocarbons of ethylene series and acetylene series therewith.

In the above hydrocarbons, hydrocarbons of ethylene series and acetylene series are more preferable than the halogenated hydrocarbons.

As the halogenated hydrocarbons, halogenated aliphatic or aromatic hydrocarbons having at most 10 carbon atoms are preferably applicable.

The above-said unsaturated hydrocarbons of ethylene series or acetylene series preferably have at most 10 carbon atoms.

When the hydrocarbon vapor is contacted, the polycarbosilane shaped body is preferably heated at 50°-400° C.

It is preferred to conduct the above heating gradually from room temperature up to a temperature within the range of 50° to 400° C. while the hydrocarbon vapor is being contacted.

More preferably, the hydrocarbon vapor is contacted using an inert gas as a carrier gas.

The above-described shaped body is preferably a finely shaped body having an average diameter or thickness of at most about 5 mm, such as granules, powder, fibers, films or sheets.

BRIEF DESCRIPTION OF THE DRAWING

The above and other objects, features and advantages of the present invention will become more apparent from reading the following description of the preferred embodiments taken in connection with the accompanying drawings, wherein:

FIGS. 1 and 2 are X-ray diffraction patterns of a ceramic powder obtained in Example of the present invention; and FIG. 3 is an X-ray diffraction pattern of a ceramic powder obtained in Comparative Example.

DETAILED DESCRIPTION OF THE INVENTION

As hydrocarbons to be applied to the present invention, those of a low molecular weight having at most 10 carbon atoms are preferred. Amongst the halogenated hydrocarbons, preferably applicable are, for example, halides such as methyl chloride, ethyl chloride, n-propyl chloride, isopropyl chloride, n-butyl chloride, isobutyl chloride or the like; bromides such as methyl bromide, ethyl bromide, or the like; iodides such as methyl iodide, ethyl iodide or the like; aliphatic hydrocarbon halides, such as polyhalides or the like, such as methylene chloride, chloroform, carbon tetrachloride, ethylene dichloride, ethylidene chloride, methylene bromide, bromoform, methylene iodide, s-dichoroethylene, trichloroethlene, vinylidene chloride or the like; and aromatic hydrocarbon halides, such as chlorobenzene, bromobenzene, chlorotoluene, bromotoluene or the like. Amongst these hydrocarbon halides, particularly preferred are methane derivatives such as carbon tetrachloride, chloroform, methylene chloride, bromoform or the like; ethane derivatives such as ethylene dichloride, ethylidene chloride or the like; and benzene derivatives such as chlorobenzene or the like.

Further, more preferable than the above are unsaturated hydrocarbons of ethylene series or acetylene series of a low molecular weight having at most 10 carbon atoms, including, for example, ethylene, propylene, butylene, pentene, hexene, heptene, octene, decene, 2-methyl-1-butene, butadiene, 1,4-hexadiene, 1,4-pentadiene, cyclooctatetraene, cyclohexene, acrylonitrile, styrene, allene, acetylene, 4-pentene-1-yne or the like, and derivatives thereof.

These hydrocarbons are desirably of such a low molecular weight as to be in a liquid or gaseous state at room temperature. In the case of a gaseous state, it can be used by mixing with an inert gas, such as nitrogen gas, argon gas or the like, to dilute into an appropriate concentration. In the case of a liquid state, using nitrogen gas or argon gas as a carrier gas, hydrocarbon vapor in a desired concentration can be obtained by means of bubbling or the like, utilizing the vapor pressure of the liquid. Furthermore, a mixed vapor of at least two hydrocarbons can also be used.

The vapor may be in such a concentration as to be able to cure polycarbosilane shaped bodies in the form of granules, powder, fibers, films, sheets or the like. However, when hydrocarbons being in a liquid state at room temperature are employed, if the vapor concentration becomes close to a saturated vapor pressure, the vapor tends to condense on the surface of the polycarbosilane shaped bodies as the case may be, so that it is desired to dilute the vapor by mixing an inert gas therewith.

Polycarbosilanes shaped into granules, powder, fibers, films, sheets or other form are heated at 50°–400° C. and cured by contacting the hydrocarbon vapor therewith. However, polycarbosilanes generally have a softening point temperature of about 200° C. or less. Therefore, when heating is intended to conduct at a temperature higher than the softening point, it is preferred to adopt a process such that the hydrocarbon vapor is contacted while the polycarbosilanes are being heated from room temperature or a temperature lower than the softening point up to a desired temperature. According to this process, the curing progresses gradually at a temperature lower than the softening point whereby the softening point of the polycarbosilane is raised and then the hydrocarbon vapor contacts at higher temperatures, so that the curing can be effected in a short period of time.

Generally, a period of time required for curing depends upon the structure of the polycarbosilane. However, the lower the temperature, the longer the time, and vice versa. Usually curing is accomplished within 0.5–40 hours.

In the case where the above-mentioned process of heating from a low temperature is employed, generally a temperature elevation rate of 5°–20° C./hour is preferred.

The polycarbosilanes to be cured may have any shape of granules, powder, fibers, films, sheets and other fine bodies. However, since the curing progresses from surfaces, in the case where particle diameters, fiber diameters or thicknesses are large, the curing time must be extended. Therefore, the polycarbosilane shaped bodies are preferred to be such fine bodies as to have an average diameter or thickness of at most about 5 mm, such as granules, powder, fibers, films, sheets or the like. In the case of boards or other bulky shaped bodies, as a matter of fact, difficulties may be encountered for curing to progress to the inside of the shaped bodies. In such a case, powder is cured and then the cured powder can be used for shaping into thick shaped bodies.

A mechanism of curing of polycarbosilanes with hydrocarbon vapor, particularly with halogenated hydrocarbon vapor, is conjectured as follows:

Namely, it is known that in general, hydrosilane extracts chlorine from carbon tetrachloride by a radical reaction in the presence of an initiator and is converted into chlorosilane, while the thus chlorine-extracted carbon tetrachloride extracts hydrogen from the hydrosilane and produces chloroform. The inventor found that for polycarbosilanes this reaction takes place in the absence of an initiator, so that existence of silyl radicals in polycarbosilanes was assumed. However, even when a polycarbosilane solution in carbon tetrachloride is heated, a high-polymerization reaction does not take place, so that intermolecular crosslinkages are not formed. Namely, a reaction corresponding to curing does not take place. However, when polycarbosilanes are contacted with carbon tetrachloride vapor and heated, the polycarbosilanes are crosslinked to yield high polymers and thus cured into an infusible state. From the results of an IR absorption spectrum, elemental analysis and thermogravimetric analysis, decreases of Si—H bonds and C—H bonds, formation of Si—Cl bonds, a decrease of carbon content and a gain in weight were observed. The mechanism of curing is conjectured from the above that silyl radicals present in polycarbosilane molecules extract halogen atoms from hydrocarbon halides to commence a reaction and this reaction progresses by a radical chain mechanism. However, it is conjectured that a solid phase-gaseous phase reaction progresses slowly as compared with a solution reaction and the formed radicals readily react with each others between polycarbosilane molecules. Thus, it is considered that the so-called "termination reaction in radical chain mechanism" results in formation of crosslinkages.

As explained above, polycarbosilanes can be made infusible by curing according to a process wherein the polycarbosilanes are heated while being in contact with halogenated hydrocarbon vapor and, moreover, this process can obviate drawbacks inherent in conventional curing processes. However, the inventor further found that since halogens may be introduced into cured polycarbosilanes according to the above process, there still remains a fear of introducing oxygen due to hydrolysis when the cured polycarbosilanes are handled in atmosphere for a long time. In order to effectively eliminate the above-mentioned fear, it was found that vapor of unsaturated hydrocarbons of ethylene series or acetylene series can be preferably utilized.

A mechanism of curing of polycarbosilanes with vapor of an unsaturated hydrocarbon of ethylene series or acetylene series is conjectured as follows:

Namely, it is known that in general, hydrosilane undergoes an addition reaction with hydrocarbons of ethylene series or acetylene series, that is the so-called "hydrosilylation". This reaction progresses by a radical chain mechanism which takes place with extraction of hydrogen from hydrosilane usually by a free-radical initiator. Since polycarbosilanes have a lot of Si—H bonds as well as silyl radicals in their molecule, the hydrosilylation of the polycarbosilanes progresses only upon temperature elevation, even in the absence of a free-radical initiator.

However, even when, for exampler a mixture of a polycarbosilane with 1-octene is heated up to the boiling point temperature of 1-octene (122° C.), a high-polymerization reaction substantially does not take place.

It is assumed that according to the present invention, the so-called "solid phase-gaseous phase reaction" takes place using vapor of an unsaturated hydrocarbon of ethylene series or acetylene series, whereby silyl radicals in polycarbosilanes are added to carbon-carbon unsaturated bonds and thereby the softening point temperature of the polycarbosilanes is raised. Besides, a further reaction at a higher temperature is liable to cause cleavage of Si—H, C—H and Si—CH3 bonds in the polycarbosilanes, and at the same time the carbon-carbon unsaturated bonds extract hydrogen atoms or methyl groups from these Si—H, C—H and Si—CH3 bonds. Consequently, it is conjectured that in the polycarbosilanes a free-radical concentration increases to form intermolecular crosslinkages and the polycarbosilanes are cured and made infusible.

For example, a melt-spun polycarbosilane fiber was heated in cyclohexene vapor from room temperature up to 300° C. at a temperature elevation rate of 10° C./hour and retained at 300° C. for 1 hour to effect curing. Then, it was found from measurement of an infrared absorption spectrum that Si—H and C—H bonds in the polycarbosilane decreased. Further, the molecular weight increased from 2,100 to 4,000. In this instance, it was also clarified that the cured polycarbosilane was soluble in organic solvents such as tetrahydrofran, carbon tetrachloride, benzene or the like. Needless to say, it was insolubilized into the solvents by extending the curing time or raising the curing temperature.

As explained above, the process of the present invention can cure polycarbosilane shaped bodies without introducing oxygen thereinto and requires no special apparatuses. According to the above-explained more preferable embodiment of the present invention, not only oxygen but also halogen atoms are not introduced into the polycarbosilanes during curing, so that the polycarbosilane shaped bodies cured and made infusible according to such a process are free from oxygen that may otherwise be introduced by hydrolysis when the shaped bodies are handled in atmosphere for a long time. Further, since the cured polycarbosilanes can be made soluble into organic solvents as the case may be, such polycarbosilanes are advantageous in selection of shaping processes thereof into fibers, films or the like. Furthermore, ceramics obtained by pyrolysis of the polycarbosilanes cured by the process according to the present invention are SiC-based ceramics substantially free from oxygen. Therefore, the cured polycarbosilanes according to the present invention are very useful as a precursor for synthesizing ceramic materials with excellent high-temperature characteristics.

The present invention will be explained in more detail hereinafter by way of example.

EXAMPLE 1

A poly(dimethylsilylene) was pyrolytically decomposed at 450° C. to synthesize a polycarbosilane. Each 1 g of the thus prepared polycarbosilane powder was put into alumina boats which were then placed in tubular furnaces heated at 80°, 100°, 120°, 140°, 160°, 180°, 200° and 220° C., respectively. In the furnaces, a gas mixture of nitrogen gas bubbled through carbon tetrachloride at a flow rate of 20 cc/min. at room temperature with nitrogen gas at a flow rate of 30 cc/min. was flowed for 20 hours. Then, the polycarbosilane powders were heated up to 1,200° C. in an argon gas stream at a temperature elevation rate of 100° C./hour and kept at 1,200° C. for 1 hour to prepare SiC-based ceramics. As a consequence, it was found that the powders treated at 180° C. or more were SiC-based ceramic precursors which had been cured and were infusible in the step of preparing the ceramics. Further, from a result of chemical analysis, it was found that in any case, the oxygen content was not higher than 1% by weight. Thus, SiC-based ceramics with a very low oxygen content were obtained.

As a comparative example, the same polycarbosilane powder was heated up to 180° C. in an oxygen gas stream at a temperature elevation rate of 10° C./hour, with a retention time of 1 hour at 180° C., to effect curing. Then, a ceramic was prepared from the cured powder in the same manner as the above. FIGS. 1 and 3 show X-ray diffraction patterns with respect to the ceramic powders obtained by using carbon tetrachloride and oxygen, respectively, in curing. In the case where carbon tetrachloride was used for curing, it was found that the diffraction peak of cristobalite about $2\theta = 22°$ was very small and that since oxygen for restricting crystallization of $\beta$-SiC was not contained, the $\beta$-SiC had a large crystallitic size.

EXAMPLE 2

The polycarbosilane of Example 1 was melt-spun into fibers. With carbon tetrachloride vapor having the same concentration as Example 1, the fibers were heated up to 220°, 230°, 250°, 280° and 300° C., respectively, at a temperature elevation rate of 10° C./hour and on the other hand, up to 350° and 400° C., respectively, at a temperature elevation rate of 20° C./hour, with a retention time of 1 hour, to effect curing to prepare precursors. Then, the precursor fibers were heated up to 1,300° C. in an argon gas stream at a temperature elevation rate of 100° C./hour, with a retention time of 1 hour at 1,300° C., to prepare SiC-based ceramic fibers. These fibers had tensile strengths of 2.45, 1.86, 1.60, 1.22, 1.60, 1.63 and 0.79 GPa, respectively, determined with a monofilament of a 25 mm gage length and Young's moduli of 161, 148, 138, 117, 123, 113 and 105 GPa, respectively.

Alternatively, the precursor fibers obtained by curing at 230° C. were likewise fired at 1,400°, 1,500° and 1,600° C., respectively, in an argon gas stream. The thus obtained fibers had tensile strengths of 2.81, 1.70 and 1.66 GPa, respectively, and Young's moduli of 146, 221 and 224 GPa, respectively, which exhibited a small decrease in tensile strength and a remarkable increase in Young's modulus even at high temperatures.

EXAMPLE 3

A poly(dimethylsilylene) was added with 2% by weight of borodiphenyl siloxane and pyrolytically decomposed at 400° C. to synthesize a polycarbosilane which was then melt-spun into fiber. The obtained fiber was heated from 50° C. up to 190° C. at a temperature elevation rate of 10° C./hour in a stream of a gas mixture of nitrogen gas bubbled through carbon tetrachloride at a flow rate of 30 cc/min. at room temperature with nitrogen gas at a flow rate of 50 cc/min., with a retention time of 1 hour at 190° C., to effect curing to prepare a precursor fiber. This precursor fiber was heated up to 1,300° C. at a temperature elevation rate of 100° C./hour in an argon gas stream and fired by retaining at 1,300° C. for 1 hour to prepare a SiC-based ceramic filament. It had a tensile strength of 2.12 GPa and a Young's modulus of 168 GPa.

EXAMPLE 4

The polycarbosilane fiber melt-spun in Example 3 was heated from room temperature up to 220° C. at a temperature elevation rate of 10° C./hour in a stream of a gas mixture of nitrogen gas bubbled through chloroform at a flow rate of 10 cc/min. at room temperature with nitrogen gas at a flow rate of 50 cc/min., with a retention time of 1 hour at 220° C., to effect curing to prepare a precursor fiber. Then, this precursor fiber was fired in the same manner as Example 3 to prepare a SiC-based ceramic fiber. It had a tensile strength of 1.51 GPa and a Young's modulus of 148 GPa.

EXAMPLE 5

A precursor fiber was obtained by conducting curing in the same manner as Example 4 except that dichloromethane was used in lieu of chloroform. This precursor fiber was fired and a SiC-based ceramic fiber having a tensile strength of 1.50 GPa and a Young's modulus of 145 GPa was prepared.

EXAMPLE 6

A precursor fiber was obtained by conducting curing in the same manner as Example 4 except that bromoform was used in lieu of chloroform. This precursor fiber was fired and a SiC-based ceramic fiber having a tensile strength of 1.98 GPa and a Young's modulus of 155 GPa was prepared.

EXAMPLE 7

A poly(dimethylsilylene) was admixed with 5% by weight of a toluene-soluble petroleum pitch and pyrolytically decomposed at 440° C. to synthesize a polycarbosilane. This polycarbosilane was melt-spun into fiber. Then, this fiber was heated from room temperature up to 220° C. at a temperature elevation rate of 10° C./hour in a stream of a gas mixture of nitrogen gas bubbled through chlorobenzene at a flow rate of 10 cc/min. at room temperature with nitrogen gas at a flow rate of 50 cc/min., with a retention time of 1 hour at 220° C., to effect curing to prepare a precursor fiber. Then, this precursor fiber was heated up to 1,300° C. in an argon gas stream at a temperature elevation rate of 100° C./hour, with a retention time of 1 hour at 1,300° C., to effect firing. The resulting SiC-based ceramic fiber had a tensile strength of 2.51 GPa and a Young's modulus of 175 GPa.

EXAMPLE 8

A polysilane obtained by substituting 5% of methyl groups of a poly(dimethylsilylene) with phenyl groups was pyrolytically decomposed at 425° C. to synthesize a polycarbosilane. This polycarbosilane was melt-spun into fiber. Then, this fiber was heated from room temperature up to 180° C. at a temperature elevation rate of 10° C./hour in a stream of a gas mixture of nitrogen gas bubbled through carbon tetrachloride at a flow rate of 10 cc/min. at room temperature with nitrogen gas at a flow rate of 100 cc/min., with a retention time of 1 hour at 180° C., to effect curing to prepare a precursor fiber. Then, this precursor fiber was heated up to 1,300° C. in an argon gas stream at a temperature elevation rate of 100° C./hour, with a retention time of 1 hour at 1,300° C., to effect firing. The resulting SiC-based ceramic fiber had a tensile strength of 2.80 GPa and a Young's modulus of 185 GPa.

EXAMPLE 9

The polycarbosilane powder obtained in Example 1 was molded with a mold into plates of 2cm×5 cm×0.1 cm and 2 cm×5 cm×0.5 cm, respectively. These molded bodies were placed in an electric furnace heated at 180° C. and a gas mixture of nitrogen gas bubbled through carbon tetrachloride at a flow rate of 10 cc/min. at room temperature with nitrogen gas at a flow rate of 80 cc/min. was flowed for 10 hours to prepare precursor molded bodies. Then, the precursor molded bodies were heated up to 1,300° C. in an argon gas stream at a temperature elevation rate of 100° C./hour, with a retention time of 1 hour at 1,300° C., to prepare ceramics. The plate 0.1 cm thick was a dense molded body having a linear shrinkage of 27.0%, while as for the plate 0.5 cm thick, it was observed that the molded body melted in its inside, deformed and cracked.

EXAMPLE 10

The powdery precursor prepared by curing at 200° C. in Example 1 was added with 2% by weight of toluene and molded with a mold into a plate of 2 cm×5 cm×0.5 cm. After drying, the molded plate was heated up to 1,300° C. in an argon gas stream at a temperature elevation rate of 100° C./hour, with a retention time of 1 hour at 1,300° C., to prepare a ceramic plate. The resulting plate was a dense molded body having a linear shrinkage of 27.2%.

EXAMPLE 11

A poly(dimethylsilylene) was admixed with 4.5% by weight of borodiphenyl siloxane and pyrolytically decomposed at 350° C. to synthesize a polycarbosilane. One hundred grams of the polycarbosilane were added with 13 g of titanium tetrabutoxide and reacted at 300°

C. for 2 hours to prepare a polycarbosilane containing titanium. This polycarbosilane was melt-spun into fiber which was then cured in the same manner as Example 8 to prepare a precursor. The precursor fiber was further fired and a SiC-based ceramic fiber containing about 2% by weight of Ti was obtained. This ceramic fiber had a tensile strength of 2.52 GPa and a Young's modulus of 170 GPa.

EXAMPLE 12

A poly(dimethylsilylene) was pyrolytically decomposed at 450° C. to synthesize a polycarbosilane. One g of the thus prepared polycarbosilane powder was put into an alumina boat which was then placed in a tubular furnace wherein a gas mixture of nitrogen gas bubbled through cyclohexene at a flow rate of 10 cc/min. at room temperature with nitrogen gas at a flow rate of 50 cc/min. was flowed. The polycarbosilane powder was heated in the tubular furnace from room temperature up to 300° C. at a temperature elevation rate of 10° C./hour and retained for 1 hour. Then, it was further heated up to 1,200° C. in an argon gas stream at a temperature elevation rate of 100° C./hour, with a retention time of 1 hour at 1,200° C. to prepare a SiC-based ceramic as a consequence, it was found that the treated powder was a SiC-based ceramic precursor which had been cured and was infusible in the step of preparing the ceramic. Further, from a result of chemical analysis, it was found that the oxygen content was not higher than 1% by weight. Thus, a SiC-based ceramic with a very low oxygen content was obtained.

As a comparative example, the same polycarbosilane powder was heated up to 180° C. in an oxygen gas stream at a temperature elevation rate of 10° C./hour, with a retention time of 1 hour at 180° C., to effect curing. Then, a ceramic was prepared from the cured powder in the same manner as the above. FIG. 2 shows an X-ray diffraction pattern with respect to the ceramic powder obtained by using cyclohexene in curing. In the case where cyclohexene was used for curing, it was found that the diffraction peak of cristobalite about $2\theta=22°$ was very small and that since oxygen for restricting crystallization of $\beta$-SiC was not contained, the $\beta$-SiC had a large crystallitic size.

EXAMPLE 13

The polycarbosilane of Example 12 was melt-spun into fibers. With cyclohexene vapor having the same concentration as Example 12, the fibers were heated up to 300°, 320°, 340°, 360° and 400° C., respectively, at a temperature elevation rate of 10° C./hour, with a retention time of 1 hour at these temperatures, to effect curing to prepare precursors.

When some of these precursors were dissolved into tetrahydrofran, it was found that tetrahydrofuran-insoluble matter was formed at 320° C. or more. The insoluble matter increased with increasing temperature.

Then, the precursor fibers were heated up to 1,300° C. in an argon gas stream at a temperature elevation rate of 100° C./hour, with a retention time of 1 hour at 1,300° C., to prepare SiC-based ceramic fibers. These fibers had tensile strengths of 4.35, 3.98, 3.33, 3.41 and 2.80 GPa, respectively, determined with a monofilament of a 25mm gage length and Young's moduli of 204, 210, 208, 201 and 199 GPa, respectively.

Alternatively, the precursor fibers obtained by curing at 300° C. were likewise fired at 1,400° and 1,500° C., respectively, in an argon gas stream. The thus obtained fibers had tensile strengths of 1.43 and 0.86 GPa, respectively, and Young's moduli of 213 and 191 GPa, respectively, which exhibited an enough strength and a high Young's modulus even at high temperatures.

EXAMPLE 14

A poly(dimethylsilylene) was added with 2% by weight of borodiphenyl siloxane and pyrolytically decomposed at 400° C. to synthesize a polycarbosilane which was then melt-spun into fiber. The obtained fiber was heated from 50° C. up to 280° C. at a temperature elevation rate of 10° C./hour in a stream of a gas mixture of ethylene gas at a flow rate of 5 cc/min. with nitrogen gas at a flow rate of 50 cc/min., with a retention time of 1 hour at 280° C., to effect curing to prepare a precursor fiber. This precursor fiber was heated up to 1,300° C. in an argon gas stream at a temperature elevation rate of 100° C./hour and fired by retaining at 1,300° C. for 1 hour to prepare a SiC-based ceramic fiber. This fiber had a tensile strength of 3.10 GPa and a Young's modulus of 215 GPa.

EXAMPLE 15

The polycarbosilane fiber melt-spun in Example 14 was heated from room temperature up to 220° C. at a temperature elevation rate of 10° C./hour in a stream of a gas mixture of acetylene gas at a flow rate of 2 cc/min. with nitrogen gas at a flow rate of 50 cc/min., with a retention time of 1 hour at 220° C. to effect curing to prepare a precursor fiber. Then, this precursor fiber was fired in the same manner as Example 14 to prepare a SiC-based ceramic fiber. This ceramic fiber had a tensile strength of 2.80 GPa and a Young's modulus of 195 GPa.

EXAMPLE 16

A precursor fiber was obtained by conducting curing in the same manner as Example 15 except that nitrogen gas bubbled through 1-octene at a flow rate of 10 cc/min. at room temperature was used in lieu of acetylene and curing was conducted at 320° C. This precursor fiber was fired and a SiC-based ceramic fiber having a tensile strength of 3.91 GPa and a Young's modulus of 209 PGa was prepared.

EXAMPLE 17

A precursor fiber was obtained by conducting curing in the same manner as Example 16 except that 1,4-hexadiene was used in lieu of 1-octene. This precursor fiber was fired and a SiC-based ceramic fiber having a tensile strength of 3.21 GPa and a Young's modulus of 200 PGa was prepared.

EXAMPLE 18

A poly(dimethylsilylene) was admixed with 5% by weight of a toluene-soluble petroleum pitch and pyrolytically decomposed at 440° C. to synthesize a polycarbosilane. This polycarbosilane was melt-spun into fiber. Then, this fiber was heated from room temperature up to 310° C. at a temperature elevation rate of 10° C./hour in a stream of a gas mixture of nitrogen gas bubbled through styrene at a flow rate of 20 cc/min. at room temperature with nitrogen gas at a flow rate of 20 cc/min., with a retention time of 1 hour at 310° C. to effect curing to prepare a precursor fiber. Then, this precursor fiber was heated up to 1,300° C. in an argon gas stream at a temperature elevation rate of 100° C./hour, with a retention time of 1 hour at 1,300° C., to effect firing. The resulting SiC-based ceramic fiber had a tensile strength of 3.98 GPa and a Young's modulus of 199 GPa.

EXAMPLE 19

A polysilane obtained by substituting 5% of methyl groups of a poly(dimethylsilylene) with phenyl groups was pyrolytically decomposed at 425° C. to synthesize a polycarbosilane. This polycarbosilane was melt-spun into fiber. Then, this fiber was heated from room temperature up to 280° C. at a temperature elevation rate of 10° C./hour in a stream of a gas mixture of nitrogen gas bubbled through cyclohexene at a flow rate of 10 cc/min. at room temperature with nitrogen gas at a flow rate of 50 cc/min., with a retention time of 1 hour at 280° C., to effect curing to prepare a precursor fiber. Then, this precursor fiber was heated up to 1,300° C. in an argon gas stream at a temperature elevation rate of 100° C./hour, with a retention time of 1 hour at 1,300° C., to effect firing. The resulting SiC-based ceramic fiber had a tensile strength of 4.10 GPa and a Young's modulus of 235 GPa.

EXAMPLE 20

A poly(dimethylsilylene) was admixed with 4.5% by weight of borodiphenyl siloxane and pyrolytically decomposed at 350° C. to synthesize a polycarbosilane. One hundred grams of the polycarbosilane were added with 13 g of titanium tetrabutoxide and reacted at 300° C. for 2 hours to prepare a polycarbosilane containing titanium. This polycarbosilane was melt-spun into fiber which was then cured in the same manner as Example 19 to prepare a precursor. The precursor fiber was further fired and a SiC-based ceramic fiber containing about 2% by weight of Ti was obtained. This ceramic fiber had a tensile strength of 3.72 GPa and a Young's modulus of 205 GPa.

EXAMPLE 21

The polycarbosilane powder obtained in Example 20 was molded with a mold into plates of 2 cm×5 cm×0.1 cm and 2 cm×5 cm×0.5 cm, respectively. These molded bodies were placed in an electric furnace heated at 180° C. and a gas mixture of nitrogen gas bubbled through cyclohexene at a flow rate of 10 cc/min. at room temperature with nitrogen gas at a flow rate of 30 cc/min. was flowed for 10 hours to prepare precursor molded bodies. Then, the precursor molded bodies were heated up to 1,300° C. in an argon gas stream at a temperature elevation rate of 100° C./hour, with a retention time of 1 hour at 1,300° C., to prepare ceramics. The plate 0.1 cm thick was a dense molded body having a linear shrinkage of 28.5%, while as for the plate 0.5 cm thick, it was observed that the molded body melted in its inside, deformed and cracked.

EXAMPLE 22

The powdery precursor prepared by curing in Example 12 was added with 2% by weight of toluene and molded with a mold into a plate of 2 cm×5 cm×0.5 cm. After drying, the molded plate was heated up to 1,300° C. in an argon gas stream at a temperature elevation rate of 100° C./hour, with a retention time of 1 hour at 1,300° C. to prepare a ceramic plate. The resulting plate was a dense molded body having a linear shrinkage of 28.7%.

EXAMPLE 23

The polycarbosilane of Example 12 was melt-spun into fibers. The obtained fibers were heated from 150° C. up to 280° C. at a temperature elevation rate of 5° C./hour in a stream of a gas mixture of nitrogen gas bubbled through 1-octyne at a flow rate of 20 cc/min. with nitrogen gas at a flow rate of 10 cc/min., with a retention time of 1 hour at 280° C., to effect curing to prepare precursor fibers. Then these precursor fibers were fired in the same manner as Example 13 at 1300°, 1400°, 1500° and 1600° C., respectively. The thus obtained fibers had tensile strengths of 3.20, 2.75, 1.89 and 1.23 GPa, respectively, and Young's moduli of 220, 221, 209 and 199 GPa, respectively, which exhibited an enough strength and a high Young's modulus even at high temperatures.

EXAMPLE 24

The polycarbosilane of Example 12 was melt-spun into fibers. The obtained fibers were heated from 160° C. up to 280° C. at a temperature elevation rate of 7.5° C./hour in a stream of a gas mixture of nitrogen gas bubbled through 1-hexyne at a flow rate of 10 cc/min. with nitrogen gas at a flow rate of 10 cc/min., with a retention time of 3 hours at 280° C., to effect curing to prepare precursor fibers. Then these precursor fibers were fired in the same manner as Example 13 at 1300°, 1400°, 1500° and 1600° C., respectively. The thus obtained fibers had tensile strengths of 3.80, 3.15, 2.38 and 1.88 GPa, respectively, and Young's moduli of 238, 240, 227 and 214 GPa, respectively, which exhibited an enough strength and a high Young's modulus even at high temperatures.

What is claimed is:

1. A process for manufacturing a SiC-based ceramic precursor which is substantially free from oxygen, consisting essentially of curing by heating a polycarbosilane shaped body in contact with vapor of at least one hydrocarbon selected from the group consisting of unsaturated hydrocarbons of ethylene series and acetylene series at a temperature elevation rate of 5°–20° C./hour.

2. The process as claimed in claim 1, wherein said at least one hydrocarbon has at most 10 carbon atoms.

3. The process as claimed in claim 1, wherein said heating is conducted within a temperature range of 50° to 400° C.

4. The process as claimed in claim 1, wherein said heating is conducted by raising a temperature from room temperature up to a temperature within a range of 50° to 400° C.

5. The process as claimed in claim 1, wherein said vapor of at least one hydrocarbon contacts using an inert gas as a carrier gas.

6. The process as claimed in claim 1, wherein said polycarbosilane shaped body is a finely shaped body having an average diameter or thickness of at most about 5 mm, selected from the group consisting of powders, fibers and films.

* * * * *